United States Patent
Rich et al.

(10) Patent No.: US 7,837,251 B2
(45) Date of Patent: Nov. 23, 2010

(54) REAR-QUARTER WINDOW APPEARANCE

(75) Inventors: Stewart Rich, Powell, OH (US); Brock Stull, Columbus, OH (US); Akihiko Kuribayashi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 12/212,993

(22) Filed: Sep. 18, 2008

(65) Prior Publication Data
US 2009/0072581 A1    Mar. 19, 2009

Related U.S. Application Data

(60) Provisional application No. 60/973,616, filed on Sep. 19, 2007.

(51) Int. Cl.
  *B60J 1/10*    (2006.01)
  *E06B 7/16*    (2006.01)
  *E06B 7/22*    (2006.01)
(52) U.S. Cl. ............... 296/146.15; 296/201; 49/498.1; 49/490.1; 49/475.1
(58) Field of Classification Search ............. 296/146.1, 296/146.9, 146.15, 93, 201, 202; 49/498.1, 49/490.1, 475.1
See application file for complete search history.

(56) References Cited

U.S. PATENT DOCUMENTS

| 4,370,832 A |   | 2/1983  | Koike |
|---|---|---|---|
| 5,234,250 A | * | 8/1993  | Hattass et al. ............ 296/216.09 |
| 5,261,721 A |   | 11/1993 | Conger et al. |
| 5,331,767 A |   | 7/1994  | Takeuchi et al. |
| 5,352,010 A |   | 10/1994 | Brodie et al. |
| 5,446,998 A |   | 9/1995  | Arima |
| 5,451,090 A |   | 9/1995  | Brodie et al. |
| 5,466,508 A | * | 11/1995 | Brocke et al. ............... 428/122 |
| 6,112,468 A |   | 9/2000  | Aritake et al. |

* cited by examiner

*Primary Examiner*—Patricia L Engle
(74) *Attorney, Agent, or Firm*—Mark E. Duell; Rankin Hill & Clark LLP

(57) ABSTRACT

A seal assembly for an automotive vehicle is provided that includes a seal and a molding whereby the seal is attached to the molding and the molding is attached to a rear-quarter window. The seal includes a pair of perpendicular bases and a resilient arc portion joining the perpendicular bases. The molding includes a U-shaped base, which receives the rear-quarter window and a support member. The support member is attached to the seal in such a manner to prevent excessive deformation of the seal when the door is in a closed position.

11 Claims, 3 Drawing Sheets

REAR-QUARTER WINDOW APPEARANCE

BACKGROUND OF THE INVENTION

1. Field of the Invention

The present invention relates to a rear-quarter window of an automotive vehicle having an improved appearance and more specifically to an improved seal assembly between a door and the rear-quarter window.

2. Description of Related Art

FIG. 5 shows a typical seal assembly 100 between a rear-quarter window 102 and a door 104 located in front of the rear-quarter window 102 for an automotive vehicle. The seal assembly 100 includes a seal 106 and an inner molding portion 108. The seal 106 includes a base portion 110 and a resilient-strip portion 112. The base 110 has a U-shaped configuration that defines a recess whereby the recess receives a front portion of the rear-quarter window 102. Thus, the base 110 attaches to the front portion of the rear-quarter window 102. The resilient-strip portion 112 extends away from the base 110 toward the inside of the vehicle. The resilient-strip portion 112 engages the inner molding portion 108 to thereby provide a seal between the door 104 and the rear-quarter window 102.

One disadvantage to the above seal assembly 100 is that a large gap 114 exists between the rear-quarter window 102 and the door 104. The large gap 114 results in a deteriorated appearance of the vehicle. In addition, the large gap 114 allows air to enter a space between the door 104 and the inner molding portion 108 thereby increasing the wind noise inside the vehicle and limiting the effectiveness of the seal assembly 100.

Thus, what is required is a seal assembly that overcomes the above mentioned disadvantages.

SUMMARY OF THE INVENTION

In accordance with one aspect, the present invention overcomes the above mentioned disadvantages by providing a seal assembly for an automotive vehicle situated between a door and a rear-quarter window of the automotive vehicle. The seal assembly includes a molding portion operatively attached to a front portion of the rear-quarter window and a seal portion operatively attached to the molding. The seal portion includes a first base portion, a second base portion and an arc portion. The molding portion includes a U-shaped base and a support member. The support member prevents the seal portion from collapsing when the door is in a closed position.

In accordance with another aspect of the present invention, the first base portion, the second base portion, and the arc portion define a cavity whereby the arc portion resiliently deforms into the cavity but the first and second base portions remain stationary when the door is in the closed position.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
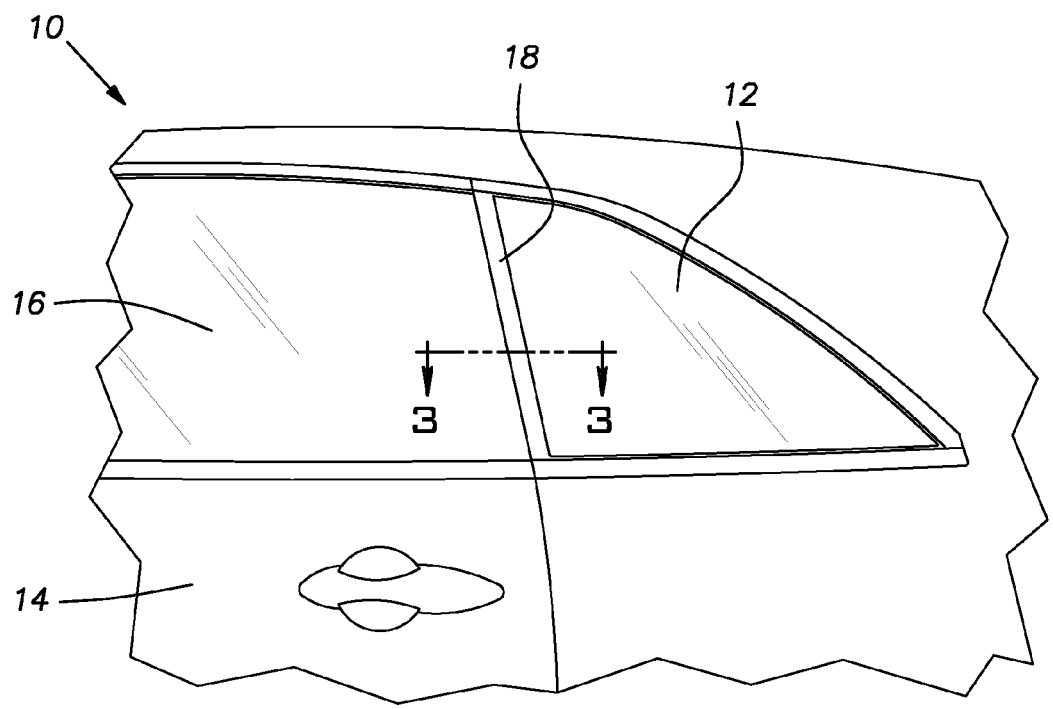
FIG. 1 is side view of a portion of an automotive vehicle showing the location of a seal assembly in accordance with the present invention.
Figure 2:
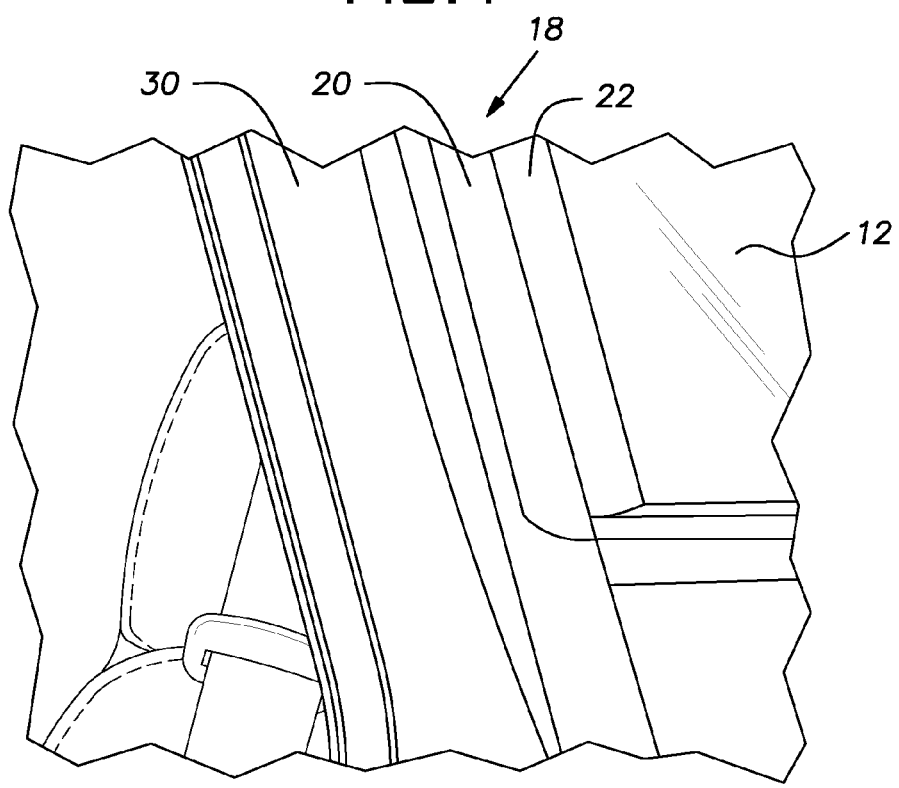
FIG. 2 is close up view of FIG. 1 with a vehicle door in an open position.

Referring now to the drawings, FIGS. 1 and 2 show a partial side view of an automotive vehicle 10 including a rear-quarter window 12 and a door 14, having a window 16, located forward of the rear-quarter window 12. The vehicle 10 also includes a seal assembly 18 located between the rear-quarter window 12 and the door 14. The seal assembly 18 includes a seal portion 20 and a molding portion 22.

Figure 3A:
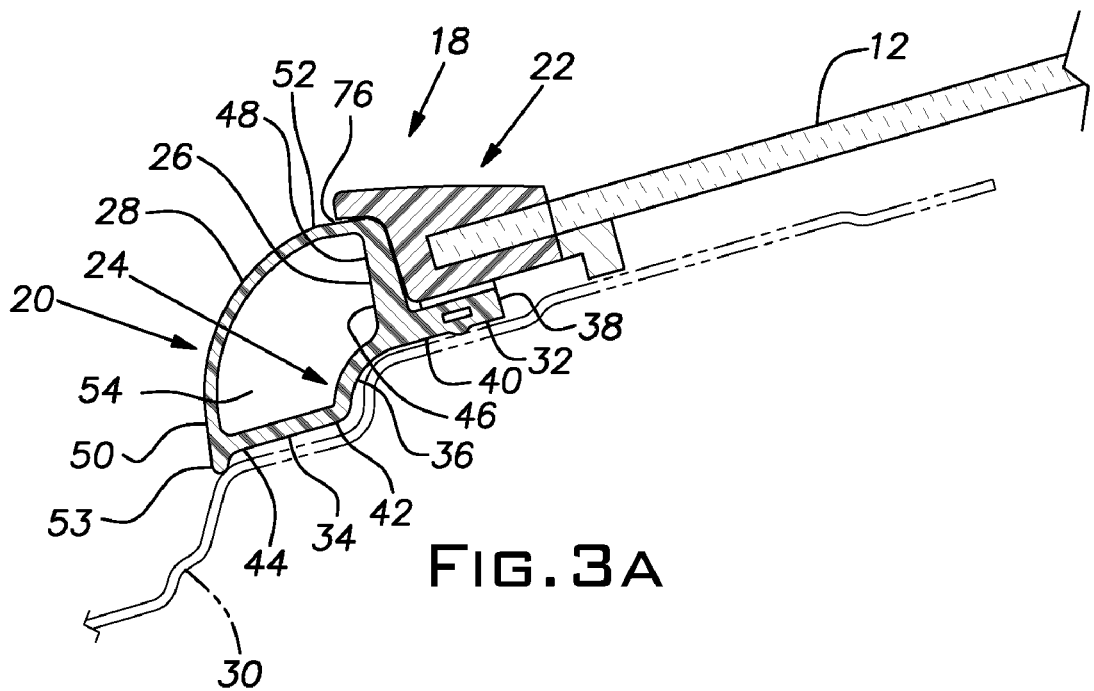
FIG. 3A is a cross section view of FIG. 1 taken along line 3-3 with the vehicle door in an open position.

Referring to FIG. 3A the seal portion 20 has a bubble type cross section and includes a first base portion 24, a second base portion 26, and an arc portion 28. The seal portion 20 can be made from any suitable resilient material known in the art such as, but not limited to, rubber. The seal portion 20 extends in a vertical direction along a pillar 30 from a point just below the bottom of the rear-quarter window 12 upwardly to a point near the roof of the vehicle 10.

Still referring to FIG. 3A, the first base portion 24 includes a first straight member 32, a second straight member 34, and a curved member 36. The first straight member 32 includes a first end 38 and a second end 40 and is adhesively attached to the molding portion 22. Alternatively, the first straight member 32 may be adhesively attached to the pillar 30. The second straight member 34 includes a first end 42 and a second end 44. The first straight member 32 and the second straight member 34 define a first plane and a second plane, respectively, and are generally parallel to but vertically spaced relative to one another. The curved member 36 extends from the first plane to the second plane such that the curved member 36 integrally joins the second end 40 of the first straight member 32 to the first end 42 of the second straight member 34.

The second base portion 26 includes a first end 46 and a second end 48 whereby the first end 46 is integrally joined to the second end 40 of the first straight member 32. The second base portion 26 extends outwardly away from the pillar 30 along the molding portion 22 and is generally perpendicular to the first straight member 32. The second base portion 26 is attached to the molding portion 22, explained in more detail further below, to prevent the seal portion 20 from collapsing when the door 14 is in a closed position.

The arc portion 28 includes a, first end 50 and a second end 52. The first end 50 of the arc portion 28 is integrally joined to the second end 44 of the second straight member 34 in such a manner that the first end 50 is substantially perpendicular to the second straight member 34. The arc portion 28 extends away from the pillar 30 in an arc-like fashion whereby the second end 52 of the arc portion 28 is integrally joined to the second end 48 of the second base portion 26 in such a manner that the second end 52 of the arc portion 28 is substantially perpendicular to the second base portion 26. The first end 50 of the arc portion 28 also extends in the opposite direction toward the pillar 30 slightly past the second straight member 34 to thereby form a nub 53. The nub 53 provides additional support for the seal portion 20 to prevent the seal portion 20 from collapsing when the door 14 is in the closed position.

Figure 3B:
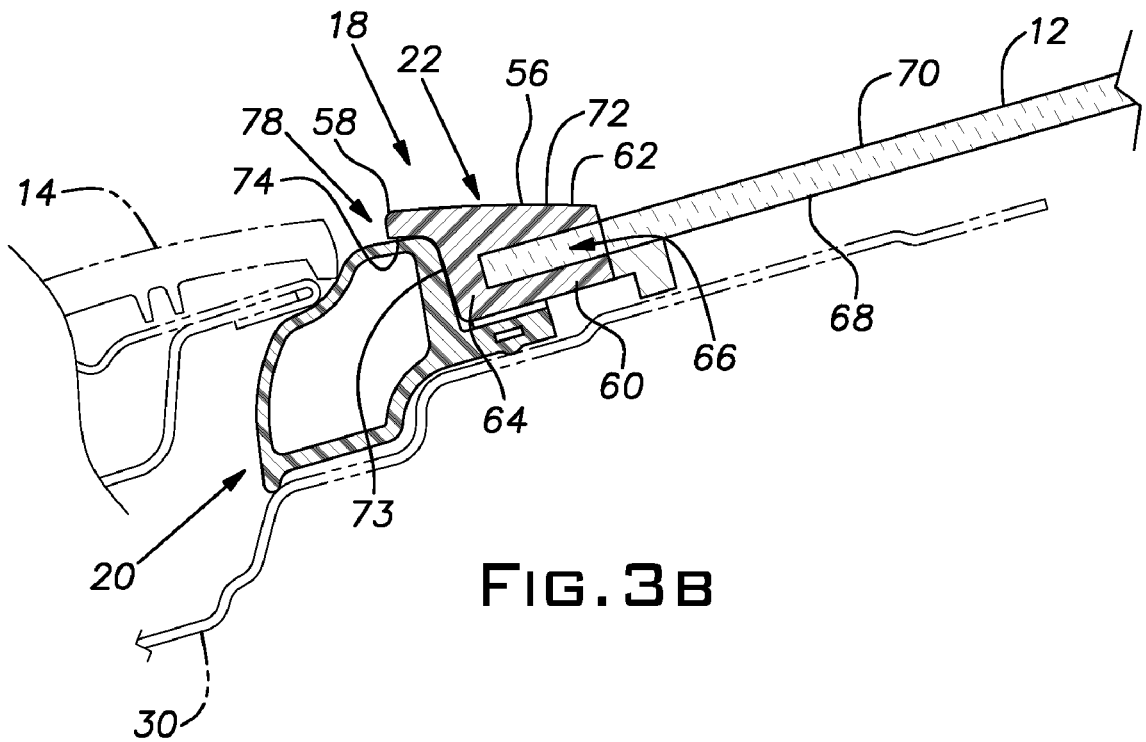
FIG. 3B is a cross section view of FIG. 1 taken along line 3-3 with the vehicle door in a closed position.

Referring to FIG. 3B, the molding portion 22 is fixedly attached to the front portion of the rear-quarter window 12 and has a generally h-shaped cross section including a U-shaped base 56 and a support member 58. The molding portion 22 can be attached to the rear-quarter window 12 by any means known in the art such as, for example, with an adhesive, mounting clips, etc. The molding portion 22 is made from a more rigid material than the seal portion 20. As such, the molding portion 22 may be made from any material commonly known in the art such as, but not limited to, plastic, polymer, etc.

The U-shaped base 56 includes an inner leg 60, an outer leg 62 and a connecting leg 64. The connecting leg 64 extends along a front edge of the rear-quarter window 12 and integrally joins the inner leg 60 and the outer leg 62. The integrally joined inner leg 60, outer leg 62, and connecting leg 64 define a recess 66, which fixedly receives the front portion of the rear-quarter window 12, as previously mentioned. The inner leg 60 is located on an inside surface 68 of the rear-quarter window 12 between the rear-quarter window 12 and the first straight member 32 of the first base portion 24. The outer leg 62 is located on an outside surface 70 of the rear-quarter window 12 and is generally parallel to the inner leg 60. An outer surface 72 of the molding portion 22 is angled such that the thickness of the outer leg 62 increases as the outer leg 62 approaches the door 14. As mentioned above, the second base portion 26 is adhered or attached to the molding portion 22. More specifically, the second base portion 26 is adhered or attached to an outer surface 73 of the connecting leg 64 so that when the door 14 is in the closed position, as shown in FIG. 3B, the second base portion 26 will not bend or deform away from the connecting leg 64, thereby preventing the seal portion 20 from collapsing. The second base portion 26 may be attached or adhered to the molding portion 22 by any means known in the art such as, for example, an adhesive or via mechanical fasteners or clips.

Figure 4:
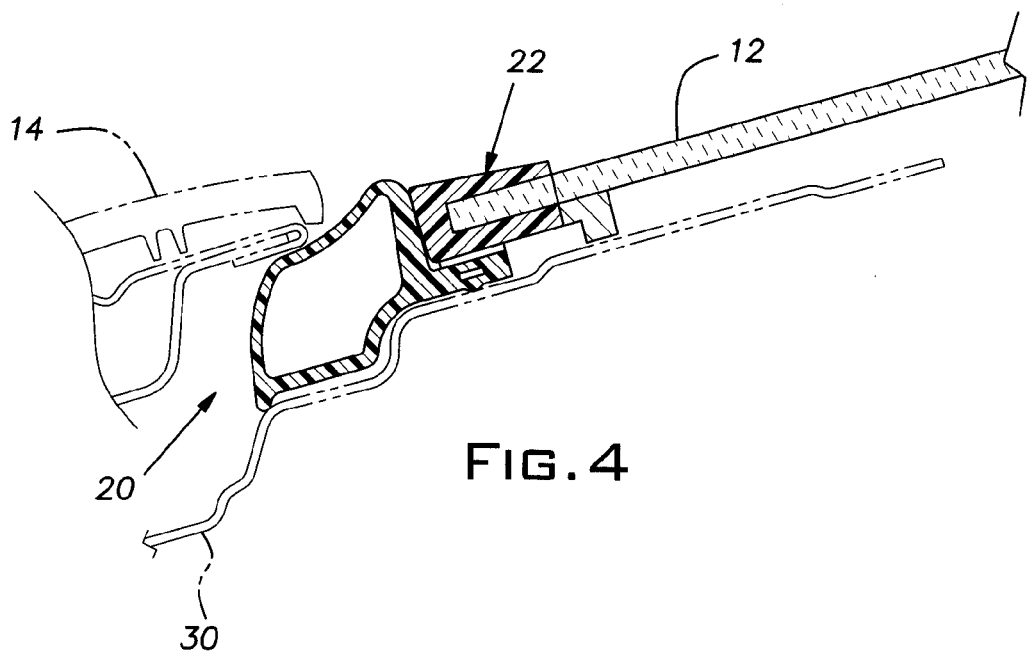
FIG. 4 is a cross-section similar to FIG. 3 showing a typical molding portion.
Figure 5:
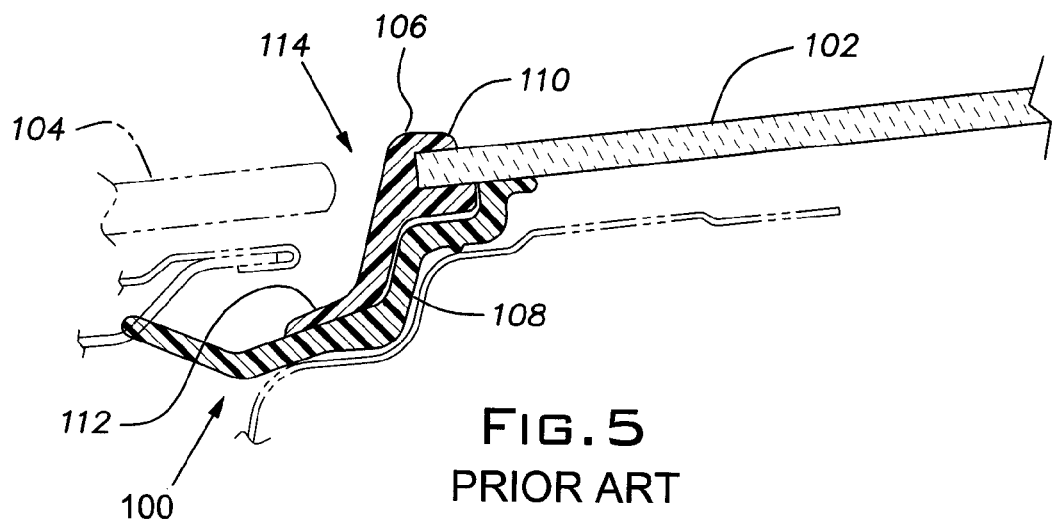
FIG. 5 is a cross section view of a typical seal assembly.

Referring to FIGS. 3A and 3B, the support member 58 integrally extends from the outer leg 62 longitudinally toward the door 14 at the same angle as the outer surface 72 of the outer leg 62. The support member 58 extends over and slightly past the second base portion 26 such that an inner surface 74 of the support member 58 is in contact with, and may be optionally adhered to, an outer surface 76 defined by the intersection of the second end 48 of the second base portion 26 and the second end 52 of the arc portion 28. Thus, when the door 14 is in the closed position, as shown in FIG. 3B, the support member 58 supports the second base portion 26 and the arc portion 28 to thereby prevent the seal portion 20 from collapsing. For example, when the support member 58 is removed from the molding portion 22 the arc portion 28 deforms or collapses when the door 14 is in the closed position, as shown in FIG. 4. This deformation deteriorates the appearance of the vehicle and compromises the performance of the seal portion 20. On the other hand, when the support member 58 is present the arc portion 28 slightly deforms but only at the point of impact of the door 14, as shown in FIG. 3B. Thus, the appearance of the vehicle and the performance of the seal are not compromised. It should be noted that the support member 58 may be attached or adhered to the seal portion 20 by any means known in the art such as, for example, an adhesive or via mechanical fasteners or clips.

Referring to FIG. 3B, in addition to providing support to the seal portion 20, the support member 58 also improves the appearance of the vehicle. More specifically, as the support member 58 extends slightly past the second base portion 26 towards the door 14, as explained above, it closes a gap 78 between the door 14 and the molding portion 22, thereby minimizing the amount of the seal portion 20 seen from outside the vehicle 10. Further, the support member 58 is angled such that the outer surface 72 of the molding portion 22 is substantially flush with the door 14 when the door 14 is in the closed position, thereby creating a fluid appearance of the vehicle 10 in the longitudinal direction.

Still referring to FIG. 3B, the integrally-formed first base portion 24, second base portion 26, and arc portion 28 cooperate to define a cavity 54 within the seal portion 20. The cavity 54 allows the arc portion 28 to resiliently deform into the cavity 54 when the door 14 is in the closed position. Thus, when the door 14 is moved from an open position (FIG. 3A) to a closed position (FIG. 3B) the arc portion 28 moves into the cavity 54 toward the pillar 30 but the first base portion 24 and the second base portion 26 remain stationary. As mentioned above, this prevents the seal portion 20 from collapsing when the door 14 is moved to a closed position.

While specific embodiments of the invention have been described and illustrated, it is to be understood that these embodiments are provided by way of example only and that the invention is not to be construed as being limited but only by proper scope of the following claims.

What is claimed is:

1. A seal assembly between a door and a rear-quarter window of an automotive vehicle comprising:
 a molding portion operatively attached to a front portion of the rear-quarter window, the molding portion including a U-shaped base and a support member, the U-shaped base having an inner leg, an outer leg, and a connecting leg; and
 a seal portion including a first stationary base attached to an outer surface of the inner leg, a second stationary base attached to an outer surface of the connecting leg such that the second stationary base is generally perpendicular to the first stationary base, and a resilient portion,
 wherein the first stationary base, the second stationary base and the resilient portion define a cavity, where the resilient portion deforms into the cavity and the first stationary base and the second stationary base remain stationary when the door is in a closed position.

2. The seal assembly of claim 1, wherein the first stationary base is operatively attached to the U-shaped base of the molding portion, and wherein the first stationary base is integrally joined to the second stationary base such that the first stationary base is generally perpendicular to the second stationary base.

3. The seal assembly of claim 2, wherein a first end of the resilient portion is integrally joined to the first stationary base and a second end of the resilient portion is integrally joined to the second stationary base such that the first end of the resilient portion is generally perpendicular to the first stationary base and the second end of the resilient portion is generally perpendicular to the second stationary base.

4. The seal assembly of claim 1, wherein an outer surface of the molding portion is angled such that a thickness of the outer leg increases as the outer leg extends toward the door, wherein the support member integrally extends from the outer leg toward the door at the same angle as the outer surface of the molding portion.

5. The seal assembly of claim 4, wherein the connecting leg extends along a front edge of the rear-quarter window and integrally joins the inner leg and the outer leg and wherein the integrally joined inner leg, outer leg, and connecting leg define a recess that receives a front portion of the rear-quarter window.

6. A combination seal and molding for an automotive vehicle comprising:
 a seal having a first base portion, a second base portion, and an arc portion; and a molding having an inner leg, an outer leg, a connecting leg, and a support member, wherein the first base portion is operatively attached to the inner leg of the molding, wherein the first base portion, the second base portion, and the arc portion cooperate to define a cavity where the arc portion resiliently deforms into the cavity while the first and second base portions remain stationary when the door is in a closed position, and wherein the first base portion includes a first straight member, a second straight member, and a curved member, wherein the first straight member defines a first plane and the second straight member defines second plane, wherein the first plane and second plane are generally parallel to each other.

7. The combination of claim 6, wherein an outer surface of the molding is angled such that a thickness of the outer leg increases as the outer leg extends toward the door and wherein the support member integrally extends from the outer leg toward the door at the same angle as the outer surface of the molding and overlies the second base portion.

8. The combination of claim 7, wherein the curved member joins the first straight member and the second straight member.

9. The combination of claim 8, wherein a second end of the first straight member is integrally joined to a first end of the second base portion and the second base portion is generally perpendicular to the first straight member.

10. The combination of claim 9, wherein a first end of the arc portion is joined to a second end of the second straight member such that the second end of the arc portion is substantially perpendicular to the second straight member, and wherein a second end of the arc portion is joined to a second end of the second base portion such that the second end of the arc portion is substantially perpendicular to the second base portion.

11. The combination of claim 10, wherein the inner leg is operatively attached to an inner surface of the rear-quarter window, the outer leg is operatively attached to an outer surface of the rear-quarter window, and the connecting leg extends between a front edge of the rear-quarter window and the second base portion of the seal, and wherein the connecting leg integrally joins the inner leg to the outer leg to define a recess that receives a front portion of the rear-quarter window.

* * * * *